United States Patent [19]

Nafarieh

[11] Patent Number: 5,235,651
[45] Date of Patent: Aug. 10, 1993

[54] ROTATION OF IMAGES FOR OPTICAL CHARACTER RECOGNITION

[75] Inventor: Asghar Nafarieh, Sunnyvale, Calif.

[73] Assignee: Caere Corporation, Los Gatos, Calif.

[21] Appl. No.: 740,914

[22] Filed: Aug. 6, 1991

[51] Int. Cl.$^5$ ............................................. G06K 9/32
[52] U.S. Cl. ...................................... 382/46; 382/62; 358/486
[58] Field of Search ...................... 382/58, 46, 62, 63; 358/486, 496, 497, 453, 462, 445

[56] References Cited

U.S. PATENT DOCUMENTS

| | | | |
|---|---|---|---|
| 4,961,231 | 10/1990 | Nakayama et al. | 382/22 |
| 5,001,766 | 3/1991 | Baird | 382/46 |
| 5,031,225 | 7/1991 | Tachikawa et al. | 382/46 |
| 5,038,393 | 8/1991 | Nanba | 382/46 |
| 5,101,448 | 3/1992 | Kawachiya et al. | 382/46 |
| 5,111,514 | 5/1992 | Ohta | 382/46 |

Primary Examiner—Jose L. Couso
Attorney, Agent, or Firm—Blakely, Sokoloff, Taylor & Zafman

[57] ABSTRACT

A method and apparatus for properly orienting an text in order to perform optical character recognition (OCR). The text is digitized and placed into an image. The image is subsampled to determine an initial "guess" about the orientation of the image. If there are are specified number of sets of lines between lines having no black-to-white or white-to-black transitions, then the image is assumed to be oriented correctly. Otherwise, the image is assumed to be perpendicular to the line-of-sight of the OCR engine and the image is rotated 90 degrees counterclockwise in a preferred embodiment. A combination of rotations and trial OCR scans for the image is performed until the best results for the trial OCR is obtained or the maximum number of iterations is exceeded. Then, the remainder of OCR is performed on the image.

8 Claims, 11 Drawing Sheets

LEFT-TO-RIGHT SCANNING

IMAGE IS PERPENDICULAR

ROTATION OF IMAGES FOR OPTICAL CHARACTER RECOGNITION

BACKGROUND OF THE INVENTION

1. Field of the Invention

This invention relates to the field of optical character recognition (OCR). More specifically, this invention relates to generating the proper orientation of an image for application of optical character recognition so that the image may be scanned and converted to text most easily.

2. Background of Related Art

Optical character recognition (OCR) is a field wherein text on hard copy is transformed by a device into text represented in a computer system in a format such as ASCII or a similar encoding. In most prior art systems, this process generally takes several steps. First the hard copy text is converted into a digitized image which may be represented in a computer system. This is done by sampling the image using hardware devices such as light-sensitive charged coupled devices (CCD's) in a camera or flat bed scanner. The camera or scanner has an interface to circuitry which digitizes the image (such as a computer system). Once the image has been digitized, a device having an OCR reader, such as a computer system, converts the digitized image to text. Many such OCR devices are well-known in the art, and one example of such an OCR system is known as the Omnipage ® brand character recognition system available from Caere ® Corporation of Los Gatos, Calif., the assignee of the present invention (Omnipage ® and Caere ® are trademarks of Caere ® Corporation). Such a system may comprise a flat-bed or hand-held scanner which comprises the necessary circuitry to transmit the image to a computer system containing the OCR software or firmware and interface circuitry. The computer system then performs the digitizing and OCR functions. One such computer system which may be used in prior art OCR applications is known as the Macintosh ® family of personal computers, such as the Macintosh ® II, or Macintosh ® SE 30 brand computer system available from Apple ® Computer, Inc. of Cupertino, Calif. (Macintosh ® and Apple ® are registered trademarks of Apple ® Computer, Inc.).

One shortcoming of prior art OCR systems is that the hard copy must be oriented in a certain way with respect to the scanner in order for OCR to be performed properly. In other words, the OCR system does not know the orientation of the input image. The user is relied upon to ensure that the hard copy is oriented properly in relation to the scanner for OCR to take place. The OCR system may require that the user scan left-to-right, right-to-left, up-to-down, or down-to-up. If the image is not oriented properly with respect to the scanner, the image may appear upside down or perpendicular to the proper line-of-sight that the OCR system expects. This will result in the inability of the OCR system to generate proper text data because the characters in the text appears sideways or upside down to the OCR system. The system relies upon the user to ensure that he is scanning in the proper direction, and scanning such that the image is oriented properly. In summary, prior art scanners do not have the ability of re-orienting the scanned image in order to perform OCR properly.

SUMMARY AND OBJECTS OF THE INVENTION

One of the objects of the present invention is to provide a means for determining whether an image is oriented properly for optical character recognition (OCR).

Another object of the present invention is to provide a means for automatically orienting images for optical character recognition.

These and other objects are provided for by a method and apparatus in a computer system of orienting an image for optical character recognition (OCR). The method comprises subsampling a first image, the first image having a first orientation. The number of transitions for the subsampled first image is stored into a first array. Then, the number of transitions per line in the first array is determined. The array is scanned and it is determined if there are a threshold number of sets of consecutive lines having transitions. Each of the sets of lines with transitions has a first number of lines with transitions, the first number being in a first range between a minimum number of lines and a maximum number of lines. If there are a threshold number of sets of of lines with transitions, then the image is properly oriented. Otherwise, the first image is rotated and stored in the first image. If trial OCR has been performed a second number of times then the remainder of OCR is performed on the first image, and the results are placed into a first text file and the process terminates. If not, trial OCR is performed on the first image, and the results are placed into a first text file. It is determined whether a first fraction of characters comprising the first text file is misclassified, and if so, then rotating the first image and storing the rotated image back into the first image. The process again performs trial OCR as discussed above. If a second fraction of characters comprising the first text file is misclassified, the second fraction being less than the first fraction, or a second fraction of the first text file is questionable, then the first image is rotated and trial OCR is performed in the manner discussed above. Otherwise, the remainder of OCR is performed on the first image, the results are placed into the first text file and the process terminates.

BRIEF DESCRIPTION OF DRAWINGS

The invention is described by way of example and not limitation in the figures of the accompanying in which like reference indicate like elements and in which.

DETAILED DESCRIPTION

The present invention covers a method and apparatus for automatically orienting images containing text for optical character recognition. In the following description, for the purposes of explanation, specific hardware devices, values, signals, and formats are set forth in order to provide a thorough understanding of the present invention. It will be appreciated, however, to one skilled in the art, that the present invention may be practiced without these specific details. In other instances, well known circuits and devices are shown in block diagram form in order to not unnecessarily obscure the present invention.

SYSTEM OF THE PREFERRED EMBODIMENT

Figure 1:
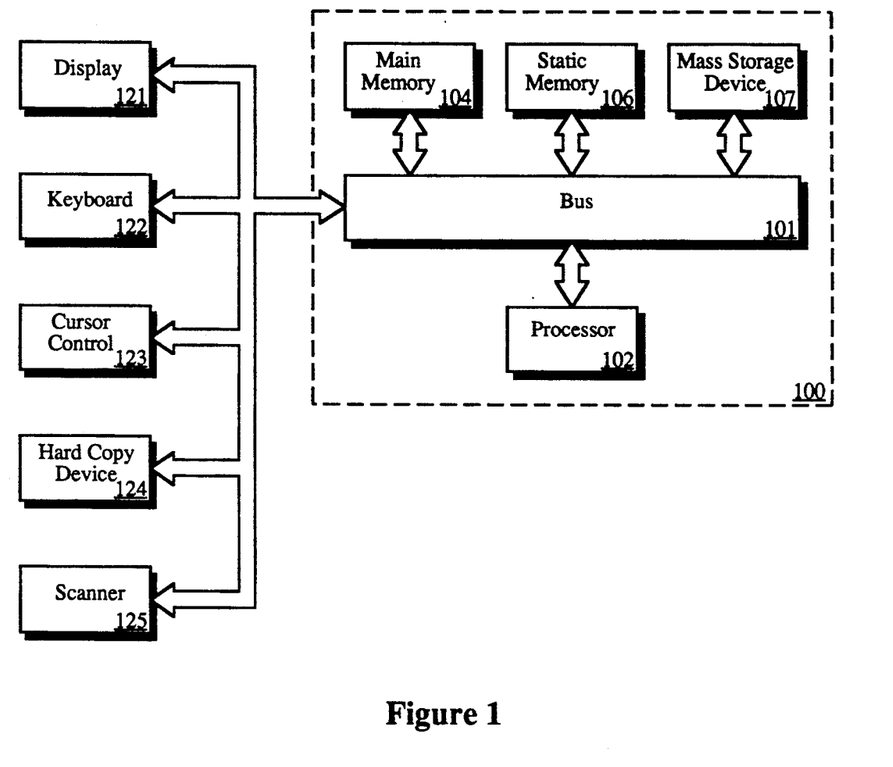
FIG. 1 shows the computer system upon which the preferred embodiment is implemented.

Referring to FIG. 1, the computer system upon which the preferred embodiment of the present invention is implemented is shown as 100. 100 comprises a bus or other communication means 101 for communicating information, a processing means 102 coupled with bus 101 for processing information, a random access memory (RAM) or other dynamic storage device 104 (referred to as main memory) coupled to bus 101 for storing information and instructions for processor 102. Computer system 100 also comprises a read only memory (ROM) and/or other static storage device 106 coupled to bus 101 for storing static information and instructions for the processor 102, a mass storage device 107 such as magnetic disk or optical disk and corresponding disk drive, coupled to bus 101 for storing information and instructions. Computer system 100 further comprises a display device 121, such as a cathode ray tube (CRT), coupled to bus 101 for displaying information to the computer user, an alpha-numeric input device 122, including alpha-numeric and other keys, coupled to bus 101 for communicating information and command selections to processor 102, and cursor control device 123, such as a mouse, a trackball, or cursor direction keys, coupled to bus 101 for communicating direction information and command selections to processor 102 and for controlling cursor movement. It is also useful if computer system 100 comprises a hard copy device 124, such a printer or other means for generating hard copies of information.

Lastly, computer system 100 of the preferred embodiment comprises a video scanner 125 which is used for converting images to digitized form to be represented in computer system 100. In the preferred embodiment, scanner 125 is hand-held employing light-emitting diodes (LED's) for illuminating portions of the image, and a system of mirrors which reflect the illuminated portions of the image back to charged-coupled devices (CCD's) in device 125 for conversion of the image by computer system 100 to digital form. The image may be represented in computer system 100 in a variety of image formats which are well-known to those skilled in the art. In an alternative embodiment, scanner 125 may be a flatbed scanner which relies upon a motor for moving the scanning head (one scanning direction thus remains constant).

In the preferred embodiment, computer system 100 is one of the Macintosh family of personal computers, such as the Macintosh SE or Macintosh II manufactured by Apple Computer, Inc. of Cupertino, Calif. running the Macintosh operating system. Processor 102 is one of the 68000 family of microprocessors manufactured by Motorola, Inc. of Schaumburg, Ill. In an alternative embodiment system 100 may be an IBM brand compatible computer system using an Intel 80286 or 80386 as processor 102 which is running the MS-DOS operating system.

Computer system 100 shown in FIG. 1 is used for the major portions of the OCR system. The OCR portion of the preferred embodiment (the portion which actually performs optical character recognition on a page) may be implemented in either hardware (discrete circuitry or firmware, for instance) or software in computer system 100. In the preferred embodiment, OCR is performed by the Typist ® brand system available from Caere ® Corporation of Los Gatos, Calif., the assignee of the present invention (Typist ® is a registered trademark of Caere Corporation). The Typist ® system comprises software residing in system 100 which is written in the "C" programming language with various portions of the system written in Motorola 68000 assembly language. Of course, it will be apparent to one skilled in the art that the OCR and digitizing software of the system may be written in other languages with the corresponding advantages and disadvantages given by those languages.

SCANNER OF THE PREFERRED EMBODIMENT

Figure 2:
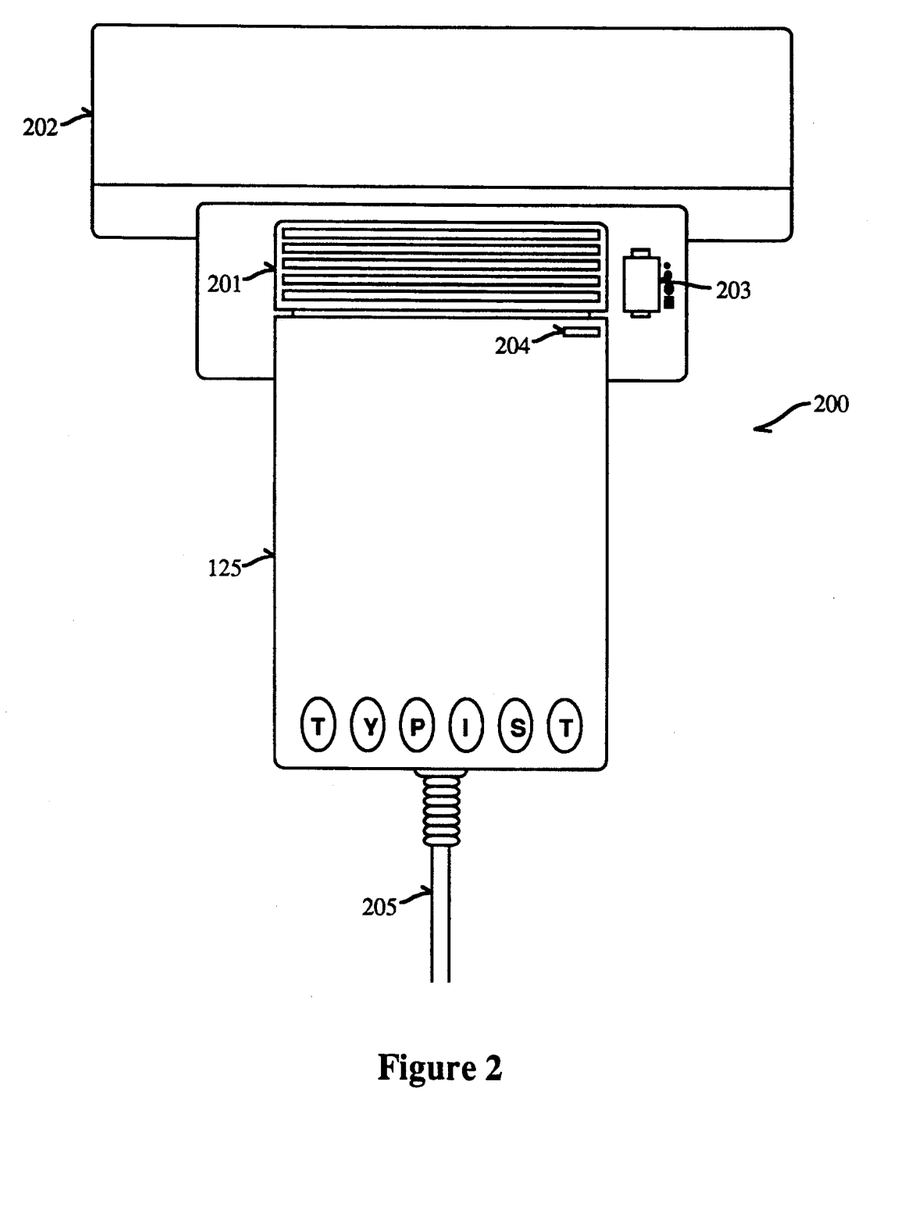
FIGS. 2 and 3 show the scanner used in the preferred embodiment.

A more detailed representation of scanner 125 of the preferred embodiment is shown with reference to FIG. 2. The preferred embodiment uses a hand-held scanner 125 which comprises several user-actuated controls as shown in the top view 200 of device 125 in FIG. 2. Device 125 comprises a head 202 which houses the sampling window and mirrors which illuminated and project the sampled image back into circuitry contained within 125. Device 125 comprises a user-actuated single-pole single throw (SPST) switch 201 which illuminates LED's in 125 for sampling of the input image, and indicates to digitizing software in system 100 that sampling is taking place. Device 125 comprises a power LED 204 which indicates when power is present in device 125. Sampling device 125 also provides various options of dithering via dithering multiposition switch 203 which indicates to sampling software in system 100 the threshold at which the input image should translate various shades of grey. For text recognition, binary line-art type images (containing either black or white pixels) are generated and only one position of dithering switch 203 is used in the preferred embodiment. Various positions of 203 give different threshold levels of grey for graphic images in other applications. Device 125 also comprises a serial cable 205 for transmitting various information to computer system 100.

Figure 3:
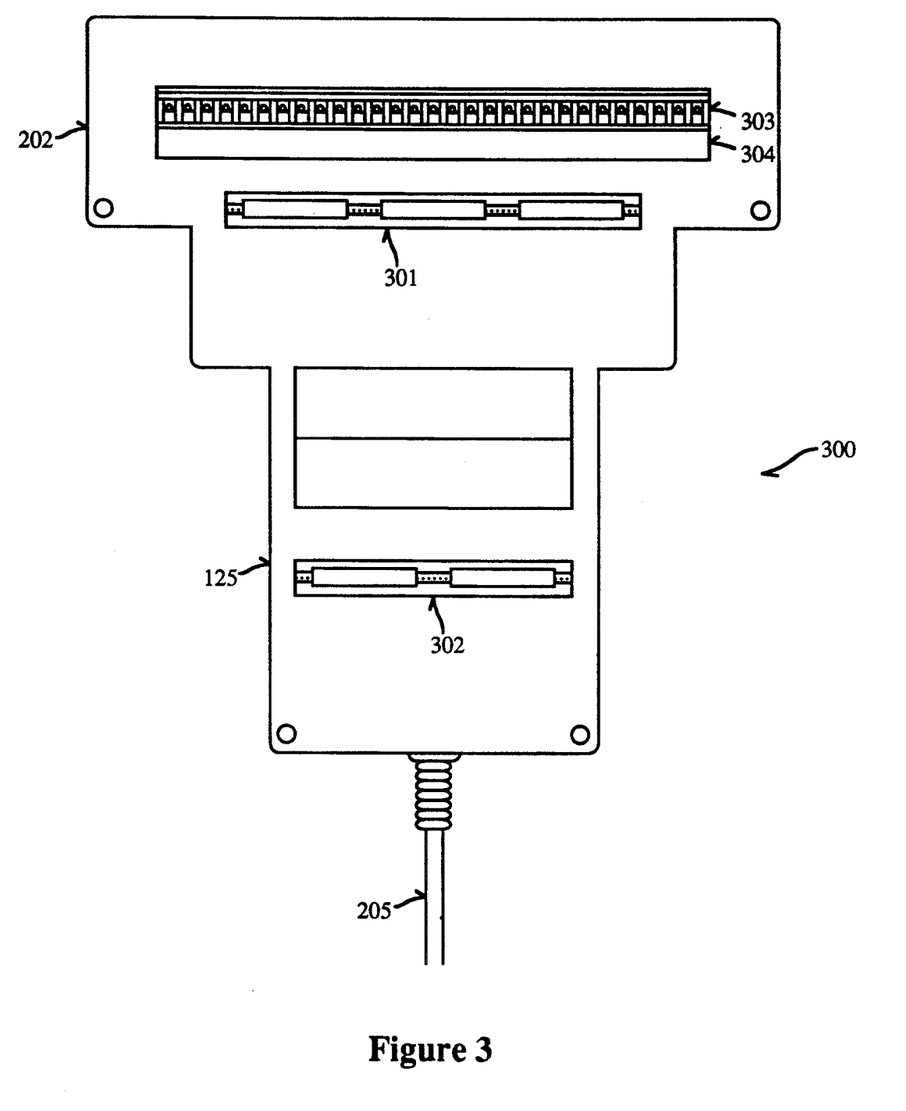

A bottom view 300 of device 125 is shown in FIG. 3. 300 shows the LED's 303 which are used for illuminating text for sampling by device 125. 300 in FIG. 3 shows the window 304 contains a mirror to reflect the illuminated portion of the image back into the CCD's contained within the body of device 125 for sampling and digitizing by system 100. 300 in FIG. 3 also shows rollers 301 and 302 which, when the device is moved across a page, signal computer system 100 that a given area of text has been traversed. The preferred embodiment scans at approximately 300 dots per inch (DPI), and therefore a sample is taken by computer system 100 when 125 has moved every 1/300 of an inch, as sensed by rollers 301 and 302. Rollers 301 and 302 comprise electromechanical or electrooptical means for sensing the movement of device 125 across a surface, such as a book, printout, or other hard copy.

SCANNING IMAGES

Figure 4:
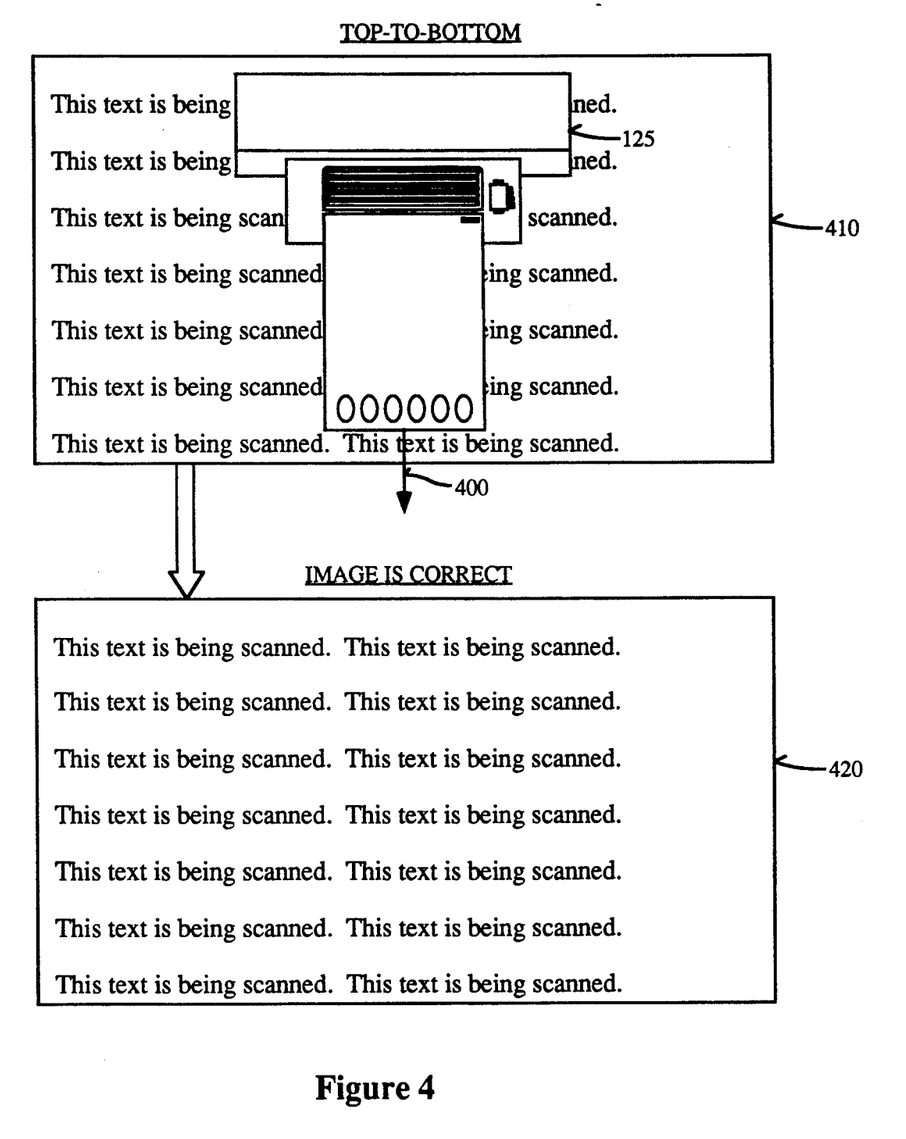
FIGS. 4 through 7 show scanning an input document in various directions and the orientation of the resulting image represented in the computer system.
Figure 5:
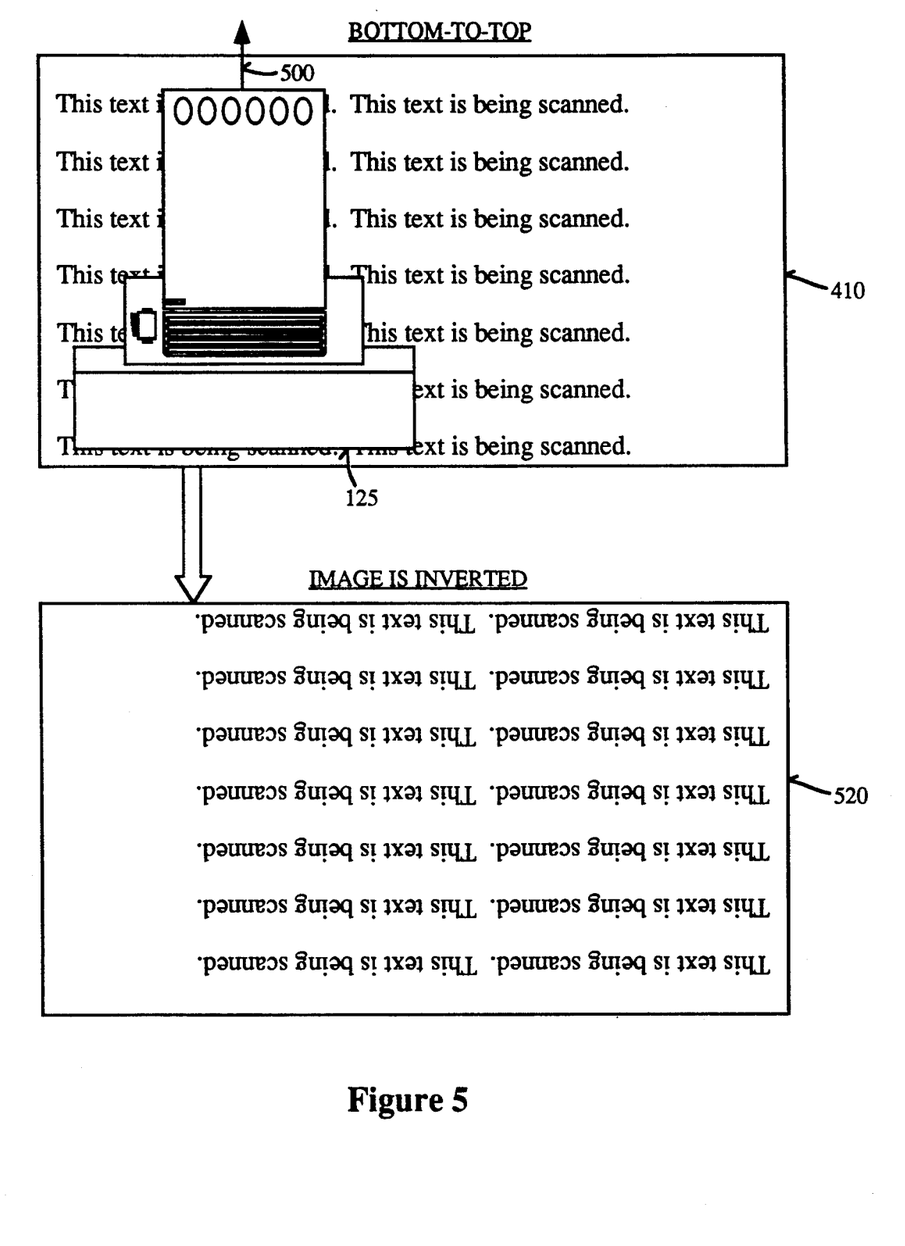
Figure 6:
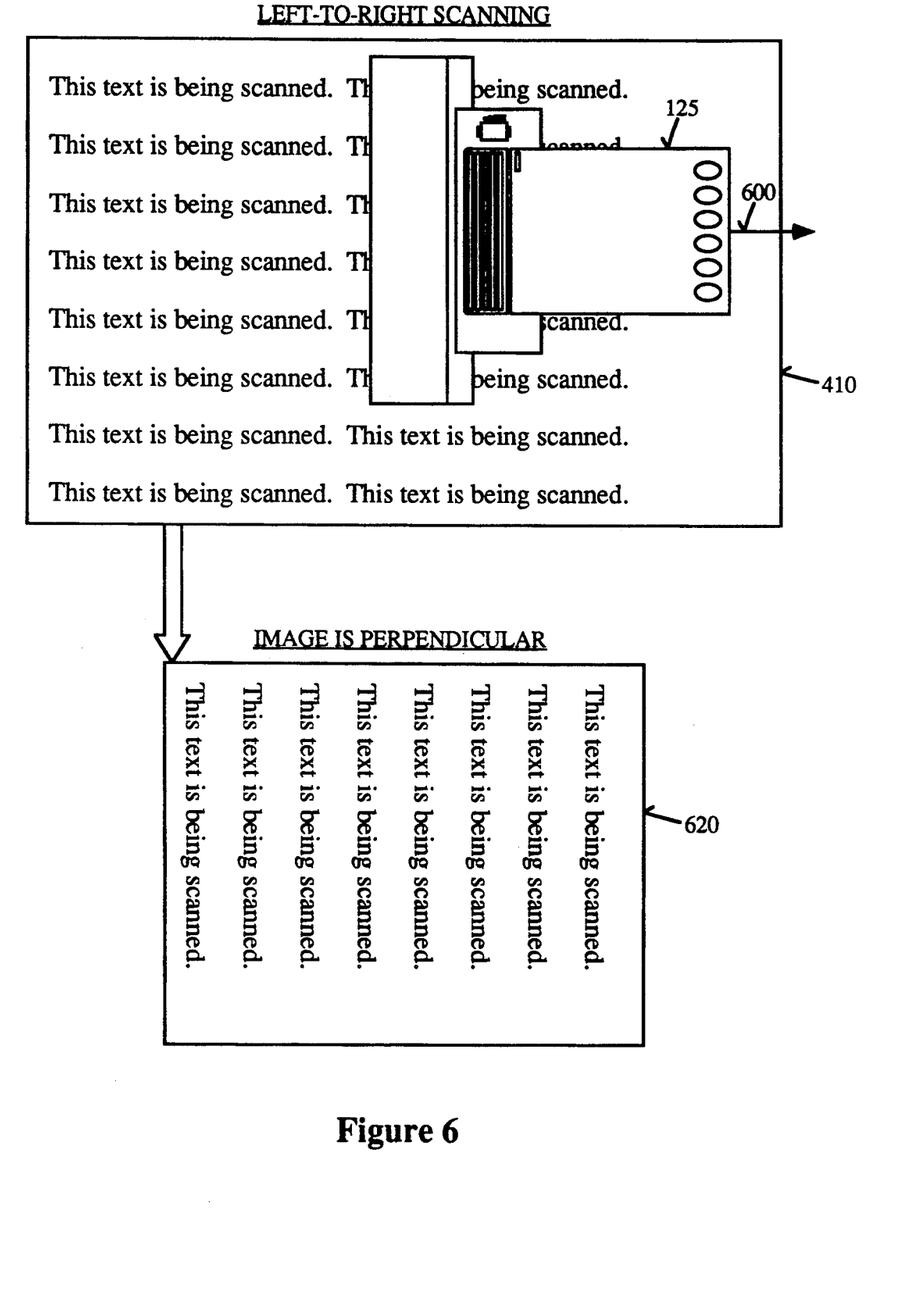
Figure 7:
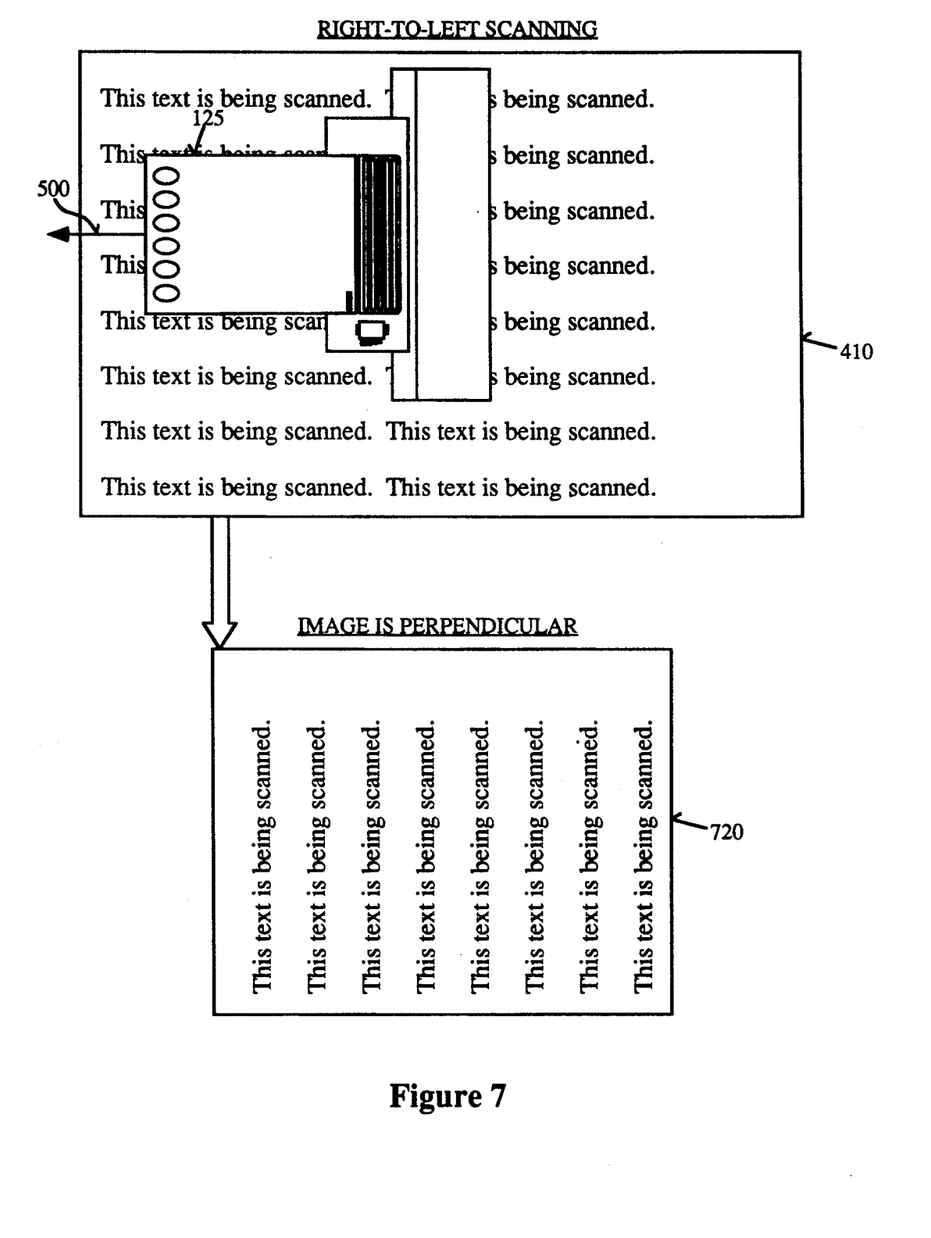

Various scans of input images and the resulting images represented in computer system 100 are shown in FIGS. 4 through 7. As shown in FIG. 4, when text 410 is scanned by device 125 from top-to-bottom (represented by arrow 400 in FIG. 4), the resulting image in computer system 100 is properly oriented for OCR to be performed, as represented by image 420. When scanning from bottom-to-top as indicated by arrow 500 shown in FIG. 5, the resulting image 520 is inverted. When scanning from left-to-right in direction 600 as shown in FIG. 6, the resulting image 620 is represented perpendicular in the computer system. When scanning from right-to-left in direction 700 as shown in FIG. 7, the resulting image 720 is also represented perpendicular in the computer system, however, it is oriented the opposite of 620 in FIG. 6. Any of the errors in orienting the input image may occur by the user placing the input image such as 410 in an improper position with reference to a flat-bed scanner, or by moving the hand-held scanner 125 in a direction other than the OCR system expects, such as shown in FIGS. 5 through 7. Therefore, the preferred embodiment provides a means for determining the current orientation of the input image and taking corrective measures to re-orient the image so that OCR may be applied to the image generating text to be represented in ASCII or similar format in system 100.

ORIENTING IMAGES IN SYSTEM 100

Figure 8:
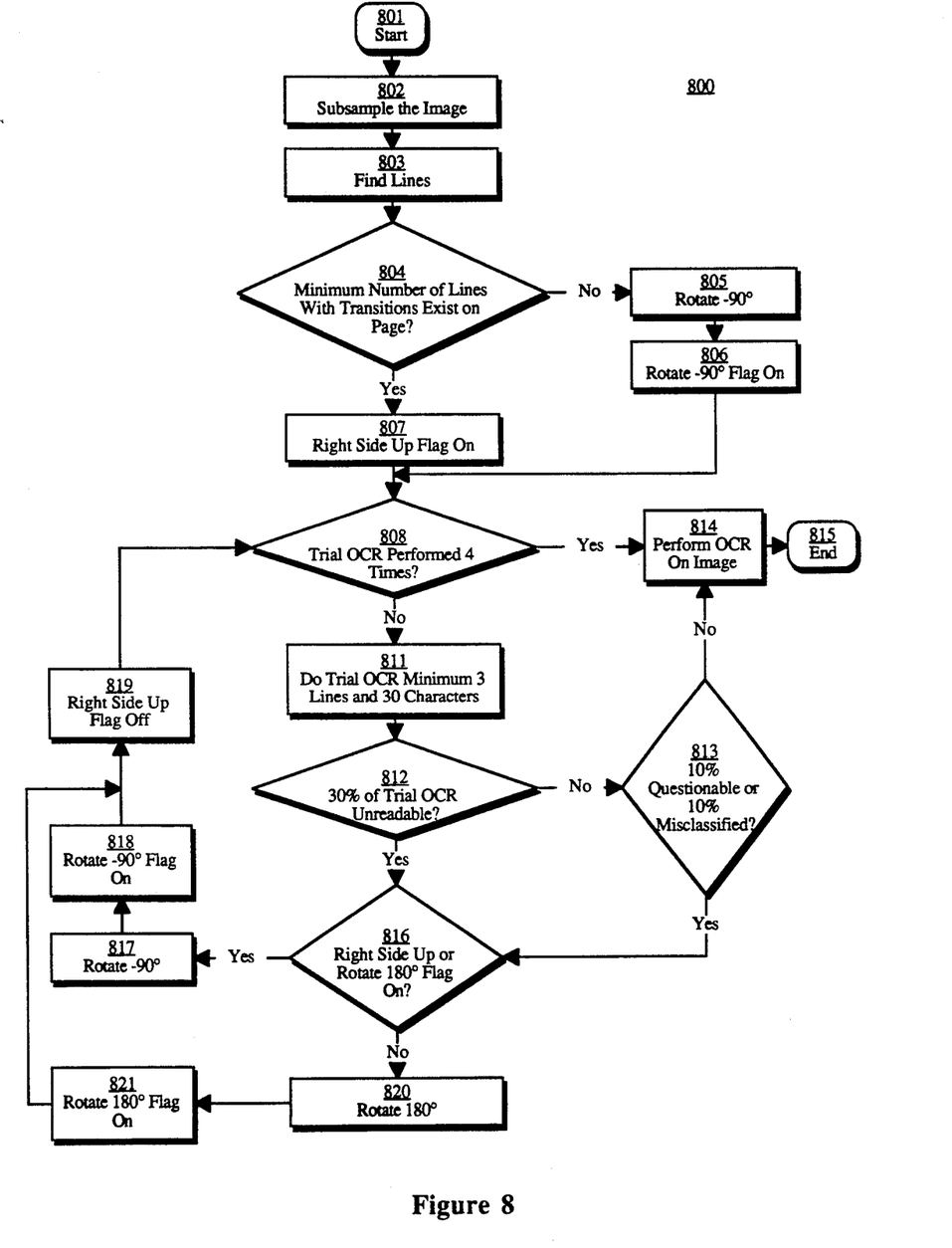
FIG. 8 shows the orientation method of the preferred embodiment.

Process 800 as shown in FIG. 8 assumes that the input text has already been digitized into an image represented in system 100 which may be processed. Also, process 800 assumes that the image has already been "decomposed" into discrete blocks of text and graphics. Decomposition is a process well-known in the OCR art and is by process 800 to determine the length of text blocks which are checked for orientation. When placed into an "auto-orientation" mode, system 100 performs a process 800 which can preprocess the digitized input image to determine if it is properly oriented in order to perform OCR. If the image is not properly oriented, the image is apparently "rotated" or modified within the memory of computer system 100 in a manner well-known by those skilled in the art, in order to be properly oriented to perform OCR on the image. This process is discussed with reference to FIGS. 8 through 10. The preferred embodiment provides a means for "rotating" images which are perpendicular to the apparent line-of-sight of the OCR system for example images such as 620 and 720 shown in FIGS. 6 and 7. Inversion of the image is ascertained and corrected in an alternative embodiment for images such as 520 in FIG. 5.

PHASE I PROCESSING-SUBSAMPLING

Figure 9:
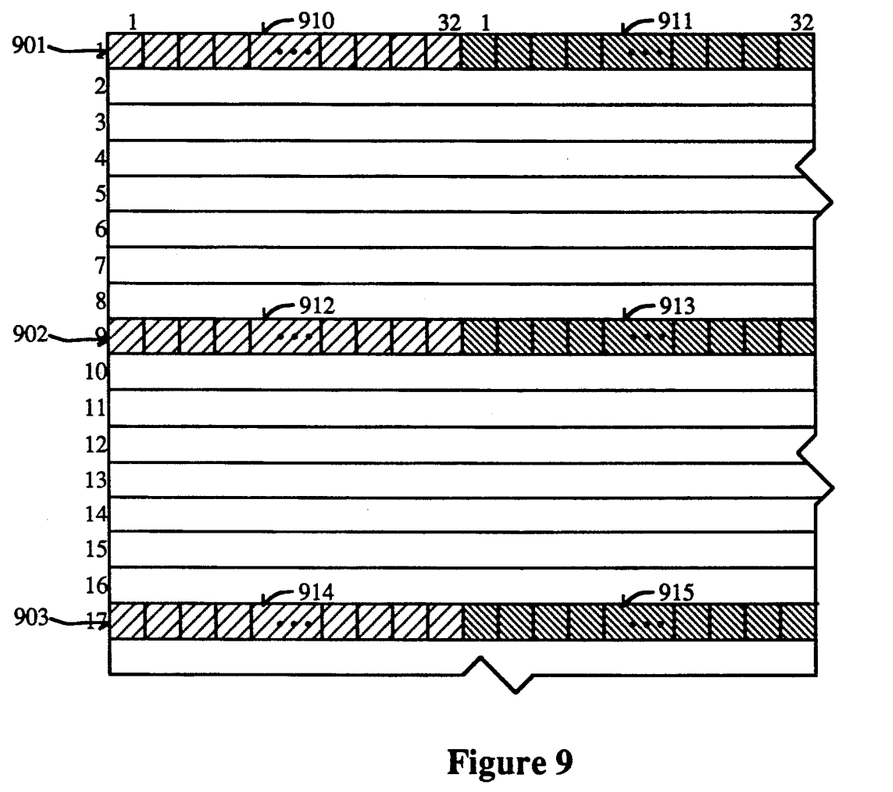
FIGS. 9 through 11 show how input images are subsampled for phase one of the orientation process.
Figure 10:
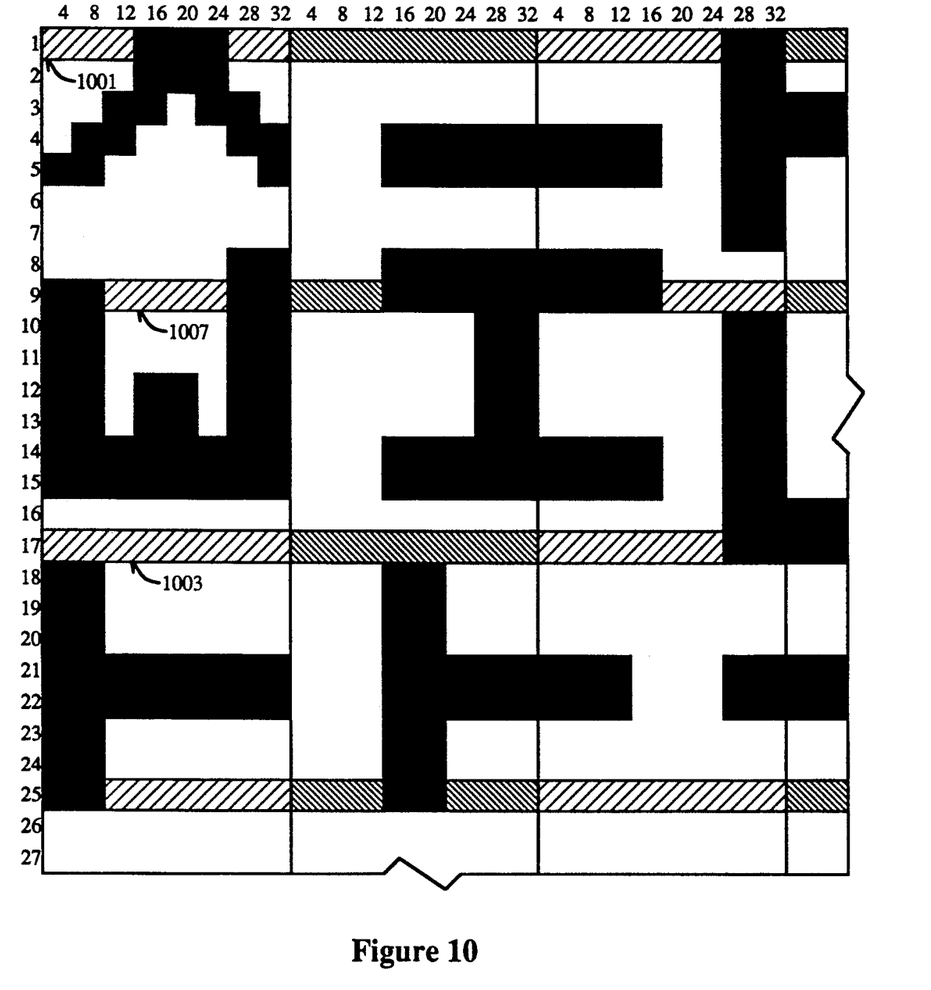

Images such as 620 and 720 are analyzed and processed by a routine such as 800 shown in FIG. 8. Process 800 starts at 801, and "subsamples" the image at 802, determining whether there are any "lines" of text which can be determined at 803. Subsampling of the image is done to conserve time and CPU overhead because a digitized page of text may comprise as much as 1.06 megabytes of binary data for an 8.5×11 inch size page which has been scanned at 300 dots per inch (DPI). Also, sufficient data exists in a "subsampled" image to make an educated "guess" about the orientation of the input image. The preferred embodiment samples locations on every 8 lines of the input image to determine the number of transitions between white and black or black and white which exist on each sampled line. As shown in FIG. 9, every 8th line such as 901, 902, and 903 is sampled for every 32 dots or pixels in the line, such as 910, 911, 912, 913, 914, and 915. An array is created which has a value for each set of 32 pixels per line such as 910-915. Transitions for white-to-black and black-to-white are maintained for each 32 pixel element. For instance, with reference to 1001 in FIG. 10, the transition count would be two. 1003, in contrast, has a transition count of 0 because the 32 dots making up element 1003 have no transitions between white and black. Non-zero lines are then determined (those that do have transitions and thus are not blank).

Figure 11:
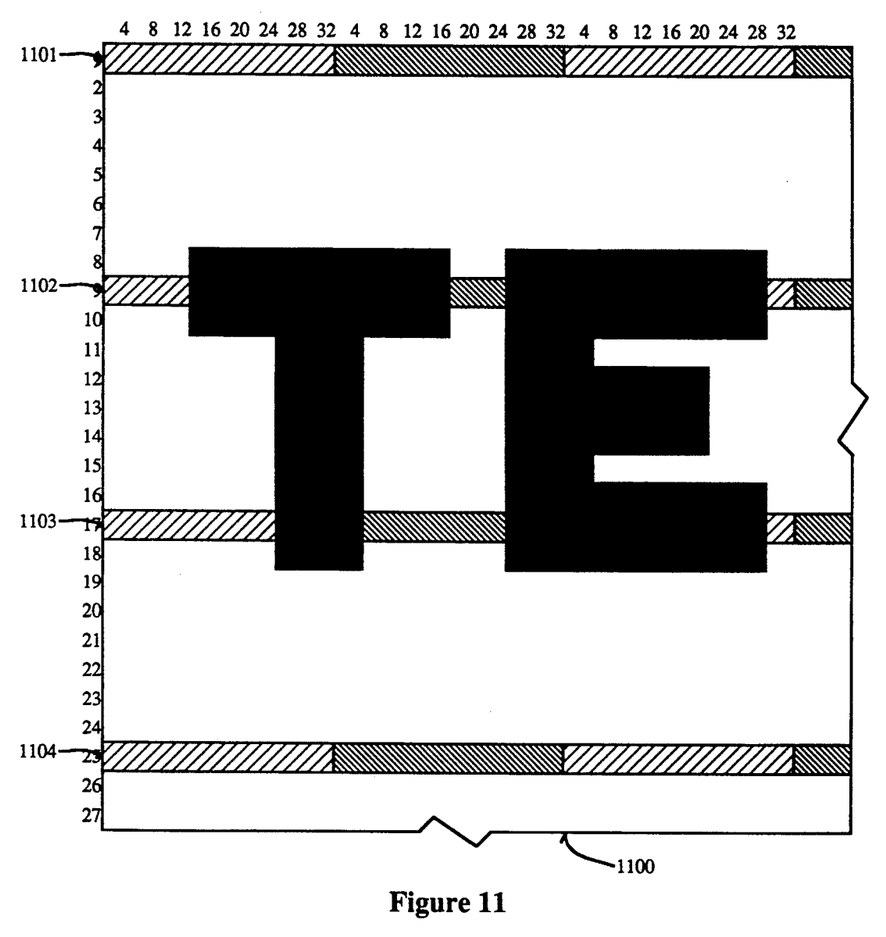

Transition counts are scanned per line in the subsampled array, and if a line does not exceed a minimum number of non-zero elements, then it is assumed to be blank. This is determined at 803, wherein the lines in the page are determined by scanning the subsample array to determine consecutive lines which have transitions between those lines which do not. The preferred embodiment looks at non-zero lines to determine whether, in fact, they are blank (they do not contain data). Normally blank lines may generate a minimum number of non-zero elements due to noise, dust on the scanner, or other errors. To ensure that noise in some elements does not cause a non-zero line to be indicated, it is determined whether there are a minimum number of non-zero elements such as 910, 911, etc. . . . , in each line which is indicated as non-zero. In one example, you might need four non-zero elements in the array for each row in order for it to be a non-zero row. Consecutive lines in the subsampled array which have a minimum number of elements with transitions are totalled between two lines which do not have the minimum number of transitions in elements. A text line is considered one in which a number of consecutive non-zero transition sample lines which falls between a minimum and maximum values. For different quality text, this range varies. In the preferred embodiment, for standard text such as from a book or other high-quality printed material, the range falls between 2 and 38. For text generated by a dot-matrix printer (which is set by the user upon entering OCR system 100), the number of non-zero transition values for lines must fall between 3 and 6. If the number exceeds the maximum value, then graphics are assumed to be present, and the sample array continues to be scanned for another zero transition sample line. Text 1100 shown in FIG. 11 is within this range because it intersects two lines 1102 and 1103, the minimum number of non-zero transition lines for high-quality text. In addition, these lines are surrounded by zero transition lines, 1101 and 1104.

It is then determined whether the total number of text lines using this method exceeds a threshold at step 804. In a preferred embodiment, this is determined using a function of the block size containing text (resulting from the image decomposition, discussed above), and the vertical size of the sampled image. In the preferred embodiment, the threshold is computed by ensuring that the total vertical size of all blocks is greater than half of the vertical size of the sampled image, and the total vertical size of all the blocks is at least four times as long as the number of text lines detected. Of course, other thresholds are contemplated within the spirit and scope of the invention, and this should not be viewed as limiting the present invention. If the total number of text lines with exceeds this threshold, then the current orientation of the input image is assumed to be correct, and a flag is set at step 807 indicating that the image is "right side up." This is only an assumption, and additional processing must be done within process 800 (Phase II, steps 808–819) indicating to determine whether, in fact, the text is oriented properly. If, however, the minimum number of lines falling in the proper range does not occur, as determined at step 804, then the image is assumed to be rotated 90° clockwise (like image 620 shown in FIG. 6). This is assumed because most users are right-handed and it is assumed that they have scanned the document from left to right. Therefore, using methods for rotating images which are well-known to those skilled in the art, the image is rotated 90° counterclockwise at step 805, and stored back into the image memory for additional processing. In addition, a flag is set at step 806 which indicates that rotation has been performed. The subsampling processing phase is now complete.

PHASE II PROCESSING–TRIAL OCR

Processing continues on the image at step 808. Steps 808 through 821 comprise doing trial optical character recognition for a specified number of characters in the image for a specified number of lines to determine whether the "guess" made in steps 801–807 was correct. The vast majority of the cases are correct and OCR will be able to be performed on the image correctly. However, it is first determined at step 808 whether trial OCR has been applied to the image more than four times. If so, then OCR is performed on the current orientation of the image at step 814 and process 800 ends at step 815. However, if trial OCR has not been performed greater than four times, then trial OCR is performed on the image at step 811 for a minimum of 3 lines in the image and for a total minimum of 30 characters. If three lines are read but less than 30 characters have been read, trial OCR continues until 30 characters are read to get a minimum sample of the input image. At step 812 it is determined whether 30 percent of the characters scanned were unrecognizable by the OCR engine. If so, then it is assumed that the image is incorrectly oriented, and reorientation is attempted at step 816.

Step 816 determines whether the right side up flag is set (in other words, it was assumed that the image is already right side up), or that the image has been rotated 180° (which is only performed if the 90° counterclockwise rotation failed). If so, the image is rotated 90° counterclockwise to generate an assumed proper orientation at step 817. In the case where 180° rotation was already performed, the 90° counterclockwise rotation puts the image back to the image's original orientation. At step 818, a flag is set that the image has been rotated 90° counterclockwise, and another flag is set indicating that the image is no longer right side up at step 819. If, however, the image was not right side up or had not been rotated 180°, as determined at step 816, then the image is rotated 180° at step 820 using techniques for images rotation well-known to those skilled in the art. A "rotated 180°" flag is set on at step 822, and the right side up flag is cleared at step 819. Processing then continues at step 808.

If the trial OCR performed at step 811 has less than 30 percent of the characters which are unrecognizable at step 812, it is determined at step 813 whether more than 10 percent of the characters are questionable or more than 10 percent were unrecognizable. Questionable characters are those which, using prior art OCR techniques, that the system flags as "identified" but which may be incorrectly classified. One example of a questionable character is an "i" which is missing the dot. The "i" when missing the dot may be classified as a "1" or an "l", but it is flagged as questionable so that a user may take corrective measures. If either of these conditions are present, then process 800 branches to step 816, and steps 816 through 821 are performed. In contrast, however, if less than 10 percent are questionable or less than 10 percent are unrecognizable then process 800 proceeds to step 814, and the remainder of OCR is performed on the image. Process 800 is complete at step 815.

Process 800 of the preferred embodiment is suitable for processing images which are assumed to be right-side up or perpendicular to the light-of-sight of the OCR system. However, inverted images may also be processed in an alternative embodiment. Although steps 801–807 remain the same, step 808 should be modified to allow at least 5 trial OCR runs at step 811. In addition, the image is initially rotated 180° instead of 90° counterclockwise to determine whether the image is inverted prior to attempting other orientations of the image. Of course, in this alternative embodiment, more CPU overhead is consumed, although for some applications, this may be desirable.

Thus, an invention for orienting text for optical character recognition has been described. Although the present invention has been described particularly with reference to FIGS. 1 through 11, it will be apparent to one skilled in the art that the present invention has utility far exceeding that disclosed in the figures. It is contemplated that many changes and modifications may be made, by one of ordinary skill in the art, without departing from the spirit and scope of the invention as disclosed above.

What is claimed is:

1. A method in a computer system of orienting an image for optical character recognition (OCR) comprising the following steps:
   a. subsampling a first portion of non-consecutive lines of a first image, the first image having a first orientation;
   b. storing the number of transitions for the first portion of non-consecutive lines of the first image in a first array;
   c. determining the number of transitions per line in the first array;
   d. scanning the first array and determining if there are a threshold number of sets of consecutive lines in the array having transitions, each of the sets of lines with transitions having a first number of lines with transitions, the first number in a first range between a minimum number of lines and a maximum number of lines;
   e. if there are a threshold number of sets of consecutive lines in the array with transitions, then indicating that the image is properly oriented, otherwise rotating the first image perpendicularly;
   f. if trial OCR has been performed upon the first image a second number of times then performing the remainder of OCR on the first image, placing the result in a first text file and terminating, otherwise continuing;
   g. performing trial OCR on a plurality of characters of the first image, and placing the result in the first text file;
   h. determining whether a first fraction of characters comprising the first text file is misclassified, and if so, then proceeding to step j;
   i. if a second fraction of characters comprising the first text file is misclassified, the second fraction being less than the first fraction, or the second fraction of the second text file is questionable, then proceeding to step j, otherwise performing the remainder of OCR on the first image and terminating; and j. determining whether the first image has been determined to be properly oriented or has been inverted, then rotating the first image perpendicularly, indicating that the first image is not right side up and proceeding to step f above, otherwise inverting the first image and proceeding to step f.

2. The method of claim 1 wherein the steps of rotating the image perpendicularly comprise rotating the first image 90 degrees counterclockwise.

3. The method of claim 1 wherein the second number of times is four.

4. The method of claim 1 wherein the first fraction comprises 30%.

5. The method of claim 1 wherein the second fraction comprises 10%.

6. The method of claim 1 wherein the step of subsampling the image comprises regular sampling of non-consecutive positions along non-consecutive horizontal lines in the first image.

7. The method of claim 6 wherein the subsampling comprises selecting one of every eight pixels for each of one of every eight lines in the first image.

8. The method of claim 1 wherein the step of determining transitions comprises determining transitions between white and black pixels.

* * * * *